Figure 1:
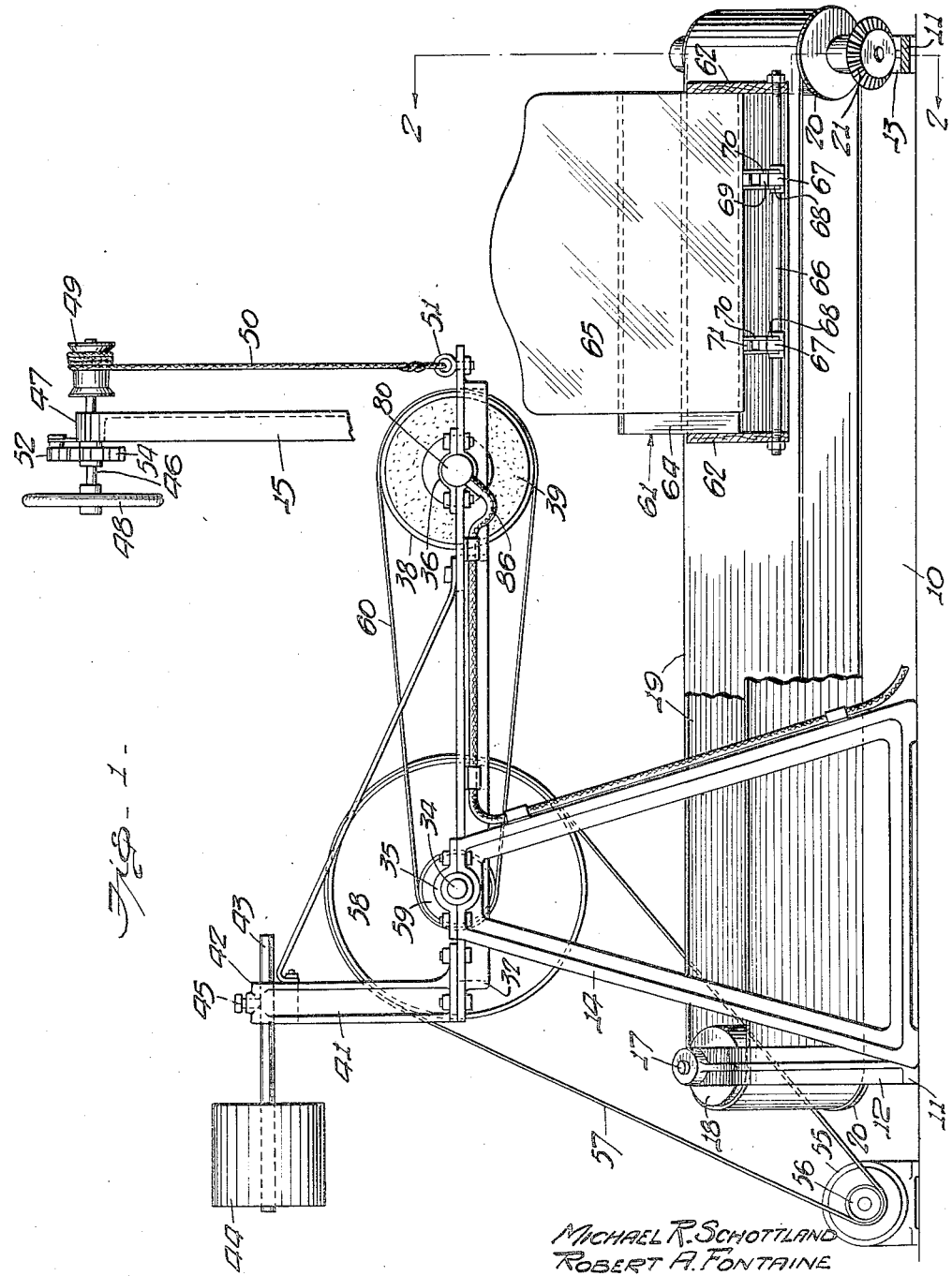

June 4, 1935. M. R. SCHOTTLAND ET AL 2,003,905
GLASS GRINDING MACHINE
Filed Sept. 13, 1932 3 Sheets-Sheet 1

Michael R. Schottland
Robert A. Fontaine
INVENTORS

BY
ATTORNEY

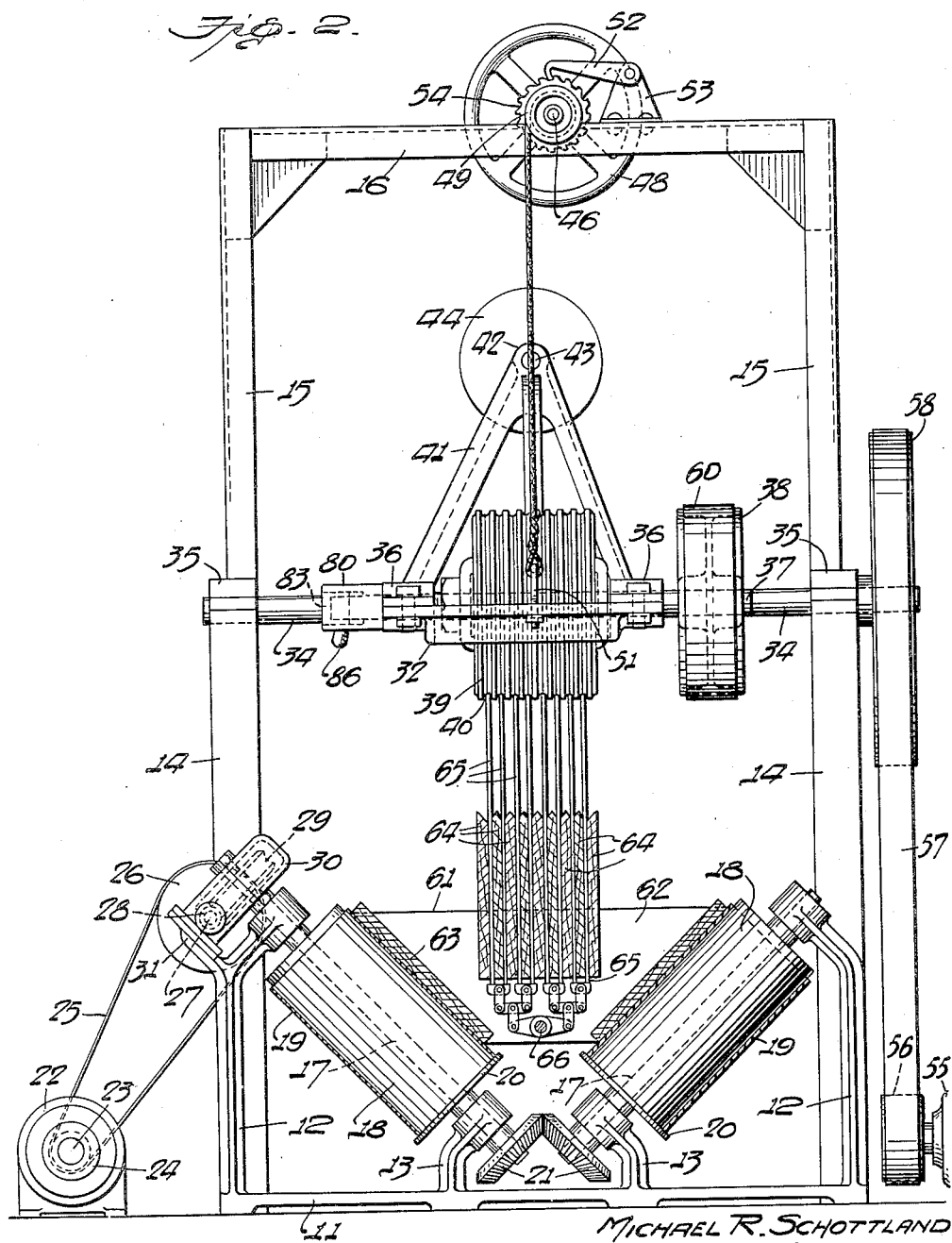

June 4, 1935.  M. R. SCHOTTLAND ET AL  2,003,905
GLASS GRINDING MACHINE
Filed Sept. 13, 1932  3 Sheets-Sheet 3
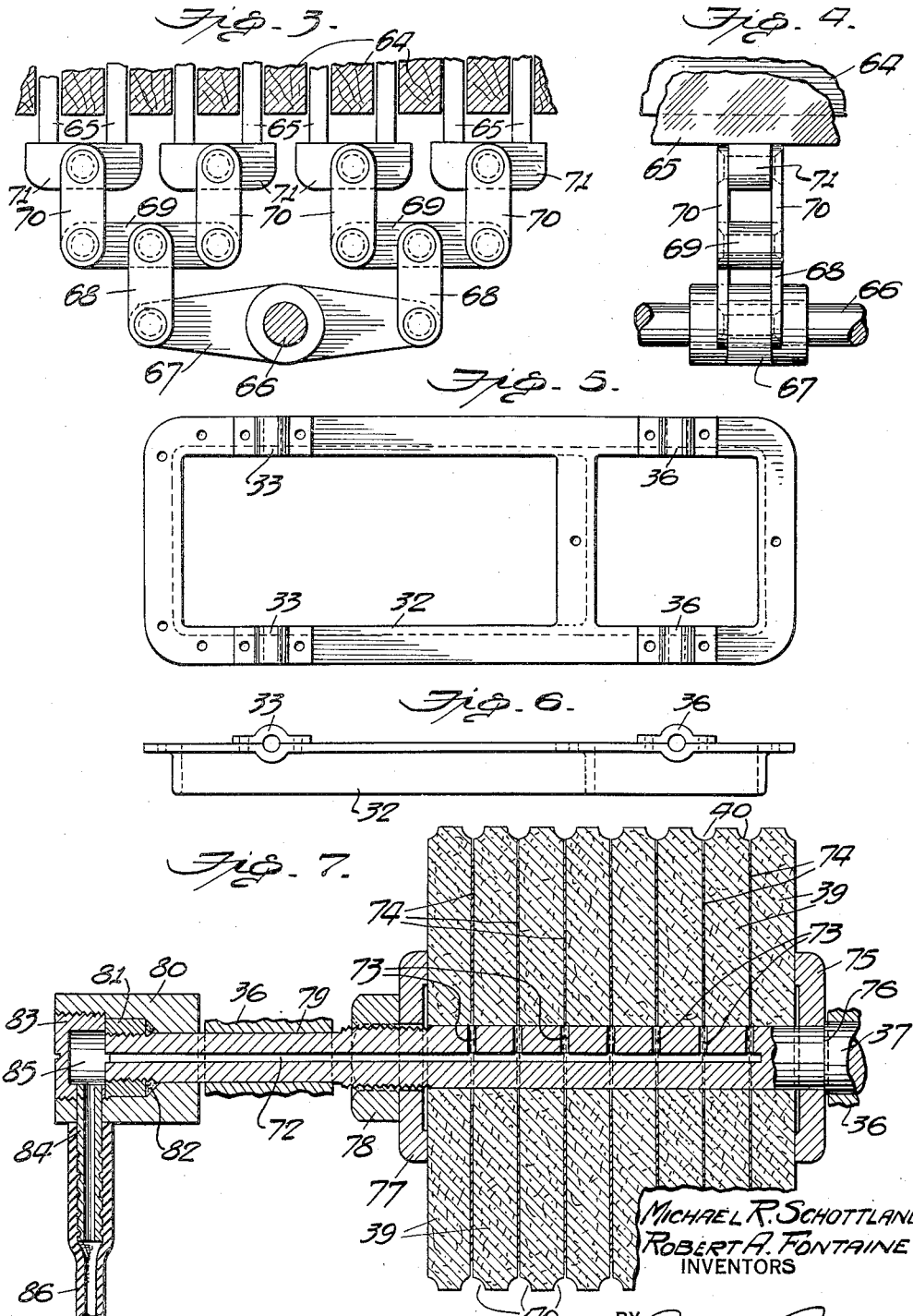
Michael R. Schottland
Robert A. Fontaine
INVENTORS
BY
ATTORNEY Patented June 4, 1935

2,003,905

UNITED STATES PATENT OFFICE 2,003,905

GLASS GRINDING MACHINE

Michael R. Schottland and Robert A. Fontaine, Martinsville, Va.

Application September 13, 1932, Serial No. 632,974

24 Claims. (Cl. 51—76)

The invention relates to machines for grinding the edges of sheets, pieces or panes of glass and has for its principal object the provision of a novel machine by means of which the edges of any desired number of sheets may be ground and dressed off at the same time, thereby greatly expediting the work and reducing the amount of labor involved.

An important object of the invention is to provide a machine of this character having a novel mechanism for conveying the sheets of glass beneath a series of grinding disks which will operate upon the edges of the glass and dress or finish them in the desired manner.

Another important object of the invention is to provide a carrier for the sheets of glass, the carrier embodying equalizing means whereby all of the glass sheets will be evenly supported and held in uniform engagement with the series of grinding disks beneath which they pass.

Another object is to provide an arrangement of grinding disks with counterbalancing means therefor for regulating the degree of pressure they exert upon the edges of the sheets of glass passing beneath, means being also provided for initially adjusting the height of the grinding disks in accordance with the width or height of the glass sheets to be worked upon.

Another and very important object is to provide a simple means for feeding water, or other desired liquid, to the grinding disks while they act upon the edges of the glass, the purpose being to keep down the temperature and also to carry away the waste, the grinding disks and their supporting means being of peculiar construction and arrangement for this particular purpose.

An additional object is to provide a machine of this character which will be simple and inexpensive to construct, easy to adjust and operate, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of a machine constructed in accordance with our invention, a part of the conveyor being broken away, Figure 2 is a view taken on the line 2—2 of Figure 1, Figure 3 is a fragmentary detail sectional view through the bottom part of the glass carrier showing the equalizing supporting means, Figure 4 is an elevation taken at right angles to Figure 3, Figure 5 is a plan view of the movable frame of the grinding device, Figure 6 is a side elevation thereof, and Figure 7 is a detail longitudinal section through the grinding disks and their spindle showing in detail the water applying means.

Referring more particularly to the drawings, we have shown the device as comprising a main supporting frame which may of course be constructed in any desired manner as regards details but which is here represented as including longitudinal frame bars 10 connected at their ends by transverse members 11 from which rise bearing brackets 12 and 13. The frame also includes a pair of substantially A-shaped supports 14 and uprights 15, the latter being connected at their upper ends by a cross bar 16. Of course these various elements may be modified and the frame may be constructed of any necessary and suitable number of parts secured together as preferred and provided with braces or reinforcements where found advisable, as there may be many variations within the purview of the invention.

Journaled through the corresponding bearing brackets 12 and 13 are downwardly converging shafts 17 carrying rollers 18 about the corresponding ones of which are trained conveyor belts 19 which are prevented from slipping downwardly by virtue of flanges 20 at the lower ends of the rollers. These two conveyor belts cooperate to define a V-shaped conveying means and the belts must of course be driven simultaneously at the same speed, for which reason the lower ends of the shafts 17 are equipped at one end of the machine with intermeshing bevel gears 21. The means for driving this V-shaped conveyor means may very conveniently be an electric motor 22 having its shaft 23 carrying a pulley 24 about which is trained a belt 25 in turn engaged about a pulley 26 on a shaft 27 carrying a worm 28 meshing with a worm wheel 29 on one of the shafts 17 equipped with the bevel gears 21. The worm 28 and worm wheel 29 are preferably enclosed within a housing 30 mounted on an extension 31 of the adjacent bearing bracket 12.

The grinding mechanism is located above the V-shaped conveyor means and is here shown as comprising a frame 32 which may be rectangular and formed as a casting and which has bearings 33 engaged upon a shaft 34 journaled in bearings

35 on the A-shaped supports 14, the intention being that the frame 32 and the mechanism carried thereby may be rockable or swingable vertically about the shaft 34 as an axis. The frame 32 is provided with other bearings 36 through which is journaled a spindle 37 equipped at one end with a pulley 38 and carrying a series of grinding disks 39 which have the edge portions of their peripheries cut away to define grooves 40. The shape of the grooves 40, which are intended to receive and grind off the edges of glass sheets in a manner to be described depends upon whether the edges are to be rounded or beveled. The construction of this grinding unit is of considerable importance and additional details regarding the same will be given hereinafter.

It is highly desirable to be able to counterbalance, at least partially, the weight of the grinding unit and to accomplish this we may provide a substantially A-shaped support 41 rising from the pivoted frame 32 at the rear end thereof, this support having a bearing portion 42 through which is slidably engaged a rod 43 carrying a weight 44 adjustable by moving the rod 43 through the bearing 42 and clamping it at a desired point by means of a set screw 45.

The sheets of glass to be ground are carried by the conveyor beneath the grinding disks 39 as will be explained and it is necessary that the grinding unit or assembly be initially disposed at the proper elevation depending upon the width or height of the pieces of glass. As a consequence we have provided a simple means for carrying out this purpose, this means conveniently comprising a shaft 46 journaled through a bearing 47 on the cross bar 16 and carrying at one end a hand wheel 48 and at its other end a drum 49 to which is secured and about which is trained a flexible member 50 connected at 51 with the forward end of the pivoted frame 32 carrying the grinding mechanism. By turning the hand wheel 48 the grinding assembly may be positioned at any desired height and such adjustment may be maintained by means of a pawl 52 pivoted on a bracket 53 carried by the cross bar 16 and cooperating with a ratchet 54 on the shaft 46.

For driving the grinding disks, we may provide a suitable electric motor 55 having its shaft carrying a pulley 56 about which is trained a belt 57 engaged about a pulley 58 carried by the shaft 34, which shaft also carries a pulley 59 about which is trained a belt 60 engaged about the pulley 38 on the spindle 37 of the grinding assembly. Naturally an equivalent drive means could be provided as there is no particular limitation in this respect though as a matter of fact this arrangement is very convenient and simple.

The means for conducting the sheets of glass through the machine so that they will be properly ground, is here disclosed as comprising a trough-like carrier designated as a whole by the numeral 61, this carrier being of box-like construction and including trapezium shaped ends 62 connected by downwardly converging sides 63 which are designed to lie flatly upon the belts 19 of the V-shaped conveyor means. Extending vertically between the ends 62 is a series of spaced partition members 64 between the successive ones of which are disposed the sheets or pieces 65 of glass to be dressed. The entrances to the spaces or slots defined between the partition members are preferably beveled as indicated in Figure 2 so as to facilitate insertion of the glass sheets. For supporting the glass at the bottom, we preferably make use of equalizing means which will insure all the sheets being held up uniformly against the grinding disks 40 as the sheets pass beneath the same. This means is shown as comprising a shaft 66 extending longitudinally of the carrier and secured to the ends 62 thereof, this shaft carrying two equalizing devices each of which comprises an arm 67 mounted at its center on the shaft or rod 66 and having pivoted to its ends upstanding links 68 which are in turn pivoted to the centers of cross arms 69 to the ends of which are pivoted upstanding links 70 each of which is pivotally connected to the center of a horizontal support 71. The lower edges of the glass sheets 65 rest upon these supports 71 and it is clear that this equalizer device will maintain all of the sheets in the same position so that they will uniformly be engaged by the grinding disks.

Another feature of great importance embodied in the invention is means for supplying water or other liquid to the grinding disks as they act upon the edges of the glass sheets. This means is clearly shown in Figure 7 wherein it will be observed that the spindle 37 is provided with a longitudinal passage 72 communicating with lateral ports 73 which open out to the periphery of the spindle at the junctures of the successive disks 39. Between the disks are absorbent elements 74 which will conduct to the grooves 40 liquid introduced through the passage 72 and discharging through the ports 73. The disks 39 as an assembly abut at one end against a collar or washer 75 positioned on the spindle in engagement with a shoulder 76 thereon and are engaged at the other end by a similar collar or washer 77, the assembly of disks 39 and interposed absorbent elements 74 being held together in clamped relation by a nut 78 screwed onto the threaded intermediate portion of the spindle and bearing against the collar or washer 77. Beyond this threaded intermediate portion the spindle is reduced and smooth for a portion of its length as shown at 79 where it passes through one of the bearings 36. Beyond this bearing the spindle carries a chambered head 80 which is rotatable with respect thereto or in other words which is stationary while the spindle rotates. The open end of the spindle terminates within the chamber in the head and is threaded for the reception thereon of a retaining collar 81 which operates to prevent longitudinal movement of the head with respect to the spindle, there being moreover packing 82 provided at the joint to make a liquid tight fit. Screwed into the threaded outer end of the chamber in the head 80 is a plug 83 seating against the retainer 81 and constituting a closure for the chamber in the head. A tube 84 extends through the side of the head and through the side of the plug in communication with a recess 85 therein which in turn communicates with the bore or passage 72. A flexible hose 86 leading from any suitable source of water or other desired liquid is engaged upon the tube 84. Clear water introduced through the hose 86 will enter the chamber 85 through the tube 84 and will pass through the passage 72 and be discharged through the ports 73 at the junctures of the disks and will be conducted by the absorbent elements 74 to the grooves 40 so that adequate moisture will be supplied to the grinding surfaces to keep down the heat generated by friction and accomplish the desired beneficial results.

In the operation of the machine, it is of course apparent that the sheets of glass 65 are inserted between the partition elements 64 so as to rest on the supports 71. Incidentally it might be mentioned that it makes no difference whether the sheets of glass have their upper edges straight or curved they may be just as effectually dressed or ground. The carrier 61 is of course in position upon the V-shaped conveyor means with its sides 63 bearing flatly upon and supported by the belts 19. The motors 22 and 55 must of course be set into operation, the former acting through the transmission above described to drive the belts and the latter operating through the belting and pulleys referred to to impart rotary movement to the assembly of grinding disks 39. When the belts are driven the carrier 61 will move longitudinally of the machine so that the upper edges of the glass sheets will engage within the grooves 40 in the grinding assembly and be effectually ground as they pass along. Owing to the pivotal mounting of the grinding assembly it is clear that it may freely follow the contour of the upper edges of the glass sheets regardless of the shape thereof. By adjusting the counterbalancing weight 44 the degree of pressure exerted upon the glass sheets may be easily varied. The function of the initial vertical adjustment of the grinding assembly has already been explained and need not be repeated.

A very important feature to be noted is that owing to the inclined belts which define the V-shaped conveyor means and the corresponding shape of the carrier 61 within which the glass sheets are supported the sheets will be accurately positioned with respect to the grooves 40 so as to insure proper alinement therewith and reception therewithin. In other words the V-shaped conveyor means coacting with the corresponding shape of the carrier will prevent any lateral shifting of the latter with respect to the grinding means, this centering or alinement being taken care of simply by gravity.

From the foregoing description and a study of the drawings it will be apparent that we have thus provided a very simply constructed, easily operated, adjusted and controlled machine by means of which a large number of sheets, panes or pieces of glass having either curved or straight edges may be ground and dressed. Moreover adequate provision has been made for adjusting the pressure of the grinding means, for regulating the height thereof and otherwise caring for varying circumstances. There is no restriction as to the number of grinding disks, of course within reasonable limits, and as a consequence the work may be carried out in volume. The provision of the water supply means is an important feature as will of course be readily understood by one familiar with the necessity for its employment. It is believed that the construction, operation and the benefits to be derived from the machine will be readily appreciated and understood by one skilled in the art without further explanation.

While we have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, we claim:

1. A glass grinding machine comprising a substantially V-shaped conveyor means, a correspondingly shaped carrier gravitationally resting thereon and formed to support a series of spaced glass sheets, a frame pivotally mounted for vertical swinging movement above the conveyor means, a spindle journaled in said frame, and a series of grinding disks carried by said spindle and adapted to engage gravitationally upon the edges of the glass sheets moved beneath them by said conveyor means.

2. A glass grinding machine comprising a substantially V-shaped conveyor means, a correspondingly shaped carrier gravitationally resting thereon and formed to support a series of spaced glass sheets, a frame pivotally mounted for vertical swinging movement above the conveyor means, a spindle journaled in said frame, a series of grinding disks carried by said spindle and adapted to engage gravitationally upon the edges of the glass sheets moved beneath them by said conveyor means, and adjustable counterbalancing means carried by said frame for regulating the pressure exerted by the grinding disks upon the glass sheets.

3. A glass grinding machine comprising a substantially V-shaped conveyor means, a correspondingly shaped carrier gravitationally resting thereon and formed to support a series of spaced glass sheets, a frame pivotally mounted for vertical swinging movement above the conveyor means, a spindle journaled in said frame, a series of grinding disks carried by said spindle and adapted to engage gravitationally upon the edges of the glass sheets moved beneath them by said conveyor means, and means located above and connected with said frame for adjusting the height of the grinding disks to accord with the height of the glass sheets.

4. A glass grinding machine comprising a substantially V-shaped conveyor means, a correspondingly shaped carrier gravitationally resting thereon and formed to support a series of spaced glass sheets, a frame pivotally mounted for vertical swinging movement above the conveyor means, a spindle journaled in said frame, a series of grinding disks carried by said spindle and adapted to engage gravitationally upon the edges of the glass sheets moved beneath them by said conveyor means adjustable counterbalancing means carried by said frame for regulating the pressure exerted by the grinding disks upon the glass sheets, and means located above and connected with said frame for initially setting the position thereof to accord with the height of the glass sheets.

5. A glass grinding machine comprising a substantially V-shaped conveyor means, a correspondingly shaped carrier gravitationally resting thereon and formed to support a series of spaced glass sheets, a frame pivotally mounted for vertical swinging movement above the conveyor means, a spindle journaled in said frame, and a series of grinding disks carried by said spindle and adapted to engage gravitationally upon the edges of the glass sheets moved beneath them by said conveyor means, the adjacent peripheral edges of the grinding disks being provided with mating recesses defining grooves for receiving the edges of the glass sheets.

6. A glass grinding machine comprising a main supporting frame, conveyor means therein formed as a pair of downwardly converging longitudinally moving lateral members, a correspondingly shaped carrier supported by said conveyor means, means within said carrier for supporting in upright position a series of sheets of glass in spaced side by side relation, and an adjustable swinging frame located above the conveyor means and carrying grinding means engageable by the edges of the sheets of glass as they are moved therebeneath by the conveyor means.

7. A glass grinding machine comprising a main supporting frame, conveyor means therein formed as a pair of downwardly converging longitudinally moving lateral members, a correspondingly shaped carrier supported by said conveyor means, means within said carrier for supporting in upright position a series of sheets of glass in spaced side by side relation, and an adjustable swinging frame located above the conveyor means and carrying grinding means engageable by the edges of the sheets of glass as they are moved therebeneath by the conveyor means, the carrier including cooperating elements located beneath the sheets of glass for holding the same up evenly against the grinding means.

8. A glass grinding machine comprising a main supporting frame, conveyor means therein formed as a pair of downwardly converging longitudinally moving lateral members, a correspondingly shaped carrier supported by said conveyor means, means within said carrier for supporting in upright position a series of sheets of glass in spaced side by side relation, and an adjustable swinging frame located above the conveyor means and carrying grinding means engageable by the edges of the sheets of glass as they are moved therebeneath by the conveyor means, the carrier embodying a system of pivotally connected arms, links and supports located beneath and engaging against the lower edges of the sheets of glass for equalizing their engagement with the grinding means.

9. A glass grinding machine comprising conveyor means formed as a pair of belts arranged about rollers having their axes converging downwardly whereby the conveyor means will be substantially V-shaped, means for simultaneously driving the belts at the same speed, grinding means located above said conveyor means, and a carrier gravitationally supported upon said conveyor means for conducting glass sheets beneath the grinding means, said carrier having downwardly converging sides flatly engaging said belts whereby gravity will operate to maintain the carrier and the sheets of glass carried thereby in alined relation to the grinding means.

10. A glass grinding machine comprising conveyor means formed as a pair of belts arranged about rollers having their axes converging downwardly whereby the conveyor means will be substantially V-shaped, means for simultaneously driving the belts at the same speed, grinding means located above said conveyor means, and a carrier gravitationally supported upon said conveyor means for conducting glass sheets beneath the grinding means, said carrier having downwardly converging sides flatly engaging said belts whereby gravity will operate to maintain the carrier and the sheets of glass carried thereby in alined relation to the grinding means, said carrier being provided interiorly with a series of spaced partition elements defining slots for receiving a series of sheets of glass.

11. A glass grinding machine comprising conveyor means formed as a pair of belts arranged about rollers having their axes converging downwardly whereby the conveyor means will be substantially V-shaped, means for simultaneously driving the belts at the same speed, grinding means located above said conveyor means, a carrier gravitationally supported upon said conveyor means for conducting glass sheets beneath the grinding means, said carrier having downwardly converging sides flatly engaging said belts whereby gravity will operate to maintain the carrier and the sheets of glass carried thereby in alined relation to the grinding means, said carrier being provided interiorly with a series of spaced partition elements defining slots for receiving a series of sheets of glass, said partition elements terminating short of the bottom of the carrier, a plurality of horizontal supports beneath said partition elements upon which the lower edges of the glass sheets rest, and a system of pivotally connected arms and links in turn connected with said horizontal supports for equalizing the engagement of the glass sheets with the grinding means.

12. In a glass grinding machine, grinding disks having peripheral grooves, conveyor belts beneath the grinding disks arranged horizontally and in spaced relation and carried by rollers having their axes converging downwardly, a carrier supported by said belts, means within the carrier for supporting in upright position a series of glass sheets whose edges are to be ground, said carrier having sides corresponding to the inclination of the upper stretches of the belts whereby gravity will maintain the carrier in centered relation to the space between the belts for insuring alinement of the upper edges of the glass sheets with and their reception within the corresponding grooves in the grinding disks.

13. A glass grinding machine comprising a main supporting frame, a pair of downwardly converging shafts at each end thereof, rollers on said shafts, conveyor belts horizontally arranged and trained about the corresponding rollers and in spaced relation, a driving connection between the shafts at one end of the machine, power means connected with one of the last mentioned shafts for driving the belts simultaneously at the same speed, a carrier gravitationally supported on said belts with its sides flatly contacting the same so as to be centered with respect to the belts, means within the carrier for supporting a series of sheets of glass in upright position, a frame swingably mounted within said main frame above the belts, a spindle journaled in said swingably mounted frame, power means for rotating said spindle, a series of grinding disks mounted on said spindle and having grooves for the reception of the upper edges of the glass sheets, means for adjusting the gravitational pressure exerted by the grinding disks upon the glass sheets, and means for feeding water to the grooves in the grinding disks.

14. In a glass grinding machine, a grinding assembly comprising a rotary spindle, a series of grinding disks mounted thereon, absorbent elements between the disks, and means connected with the spindle for feeding water therethrough and conducting the same outwardly to said absorbent elements.

15. In a glass grinding machine, a grinding assembly comprising a rotary spindle, a series of grinding disks mounted thereon for rotation therewith, absorbent elements located between the disks, said spindle having a longitudinal passage and radial ports communicating therewith and leading to the absorbent elements between the disks, and means for supplying water to the spindle during rotation thereof.

16. In a glass grinding machine, a grinding assembly comprising a rotary spindle, a series of grinding disks mounted thereon for rotation therewith, absorbent elements located between the disks, said spindle having a longitudinal passage and radial ports communicating therewith and leading to the absorbent elements between the disks, means for supplying water to the spindle during rotation thereof, comprising a chambered head stationarily mounted and within which the spindle is rotatably engaged, means on the spindle within said head for preventing shifting of the spindle longitudinally with respect to the head, and a water feed pipe connected with said chambered head.

17. A glass grinding machine comprising conveyor means, a carrier resting thereon, a movably mounted frame above the conveyor means, a series of rotary grinding disks mounted in said frame, means on said carrier for supporting a plurality of glass panes in upright position to have their edges engageable by said grinding disks, said conveyor means cooperating with the sides of the carrier for gravitationally centering the latter with respect to the grinding disks.

18. A glass grinding machine comprising conveyor means, a carrier resting thereon, a movably mounted frame above the conveyor means, a series of rotary grinding disks mounted in said frame, means on said carrier for supporting a plurality of glass panes in upright position to have their edges engageable by said grinding disks, and inclined plane means on said carrier and conveyor means cooperating gravitationally to position the glass panes definitely with respect to the grinding disks.

19. A glass grinding machine comprising conveyor means, a carrier gravitationally supported thereon and automatically slidably centered with respect thereto, means on said carrier for supporting a series of glass panes in parallel upright position, a plurality of grinding disks located above said panes and formed with grooves adapted to receive the upper edges of the panes.

20. A glass grinding machine comprising a pair of spaced conveyor means, a carrier gravitationally supported therebetween and thereon, means on said carrier for supporting a series of glass panes in parallel upright position, a plurality of grinding disks located above said panes and formed with grooves, said carrier and conveyor means cooperating gravitationally and reacting laterally to aline the panes with said grooves.

21. A grinding machine comprising conveyor members, a carrier engaging therebetween, means on the carrier for supporting a series of sheets of material in parallel upright position, grooved grinding elements mounted above said supporting means in position to engage the edges of the sheets, said conveyor members and carrier having inclined surfaces cooperating gravitationally to center said supporting means with respect to the grinding means so that the edges of the sheets will aline with said grooves.

22. A grinding machine comprising conveyor means, a carrier resting thereon, means on the carrier for supporting a series of sheets of material in parallel upright position, grooved grinding elements mounted above said supporting means in position to engage the edges of the sheets, said conveyor means and carrier cooperating to center said supporting means gravitationally with respect to the grinding means so that the edges of the sheets will aline with said grooves, said supporting means including spaced guides between which the sheets are arranged, and further including equalizing means engaging against the lower edges of the sheets.

23. A grinding machine comprising a carrier, means on the carrier for supporting a plurality of sheets of material in spaced parallel relation and upright position, grinding means located above the carrier in position to be engaged by the edges of the sheets and formed with grooves, conveyor means for moving the carrier in a direction longitudinally of the sheets so as to move the latter beneath the grinding means, said conveyor means reacting laterally with respect to the carrier for positioning the same automatically to aline the edges of the sheets with said grooves.

24. In a grinding machine comprising conveyor means and grinding means located thereadjacent, means for supporting a plurality of glass panes in spaced parallel upright position, said supporting means comprising a carrier, a double ended lever pivoted intermediate its ends within the carrier, other levers pivotally connected intermediate their ends with the ends of the first named lever, and supporting members pivotally connected at their centers with the ends of the second named levers and adapted to engage beneath the panes of glass.

MICHAEL R. SCHOTTLAND.
ROBERT A. FONTAINE.